UNITED STATES PATENT OFFICE.

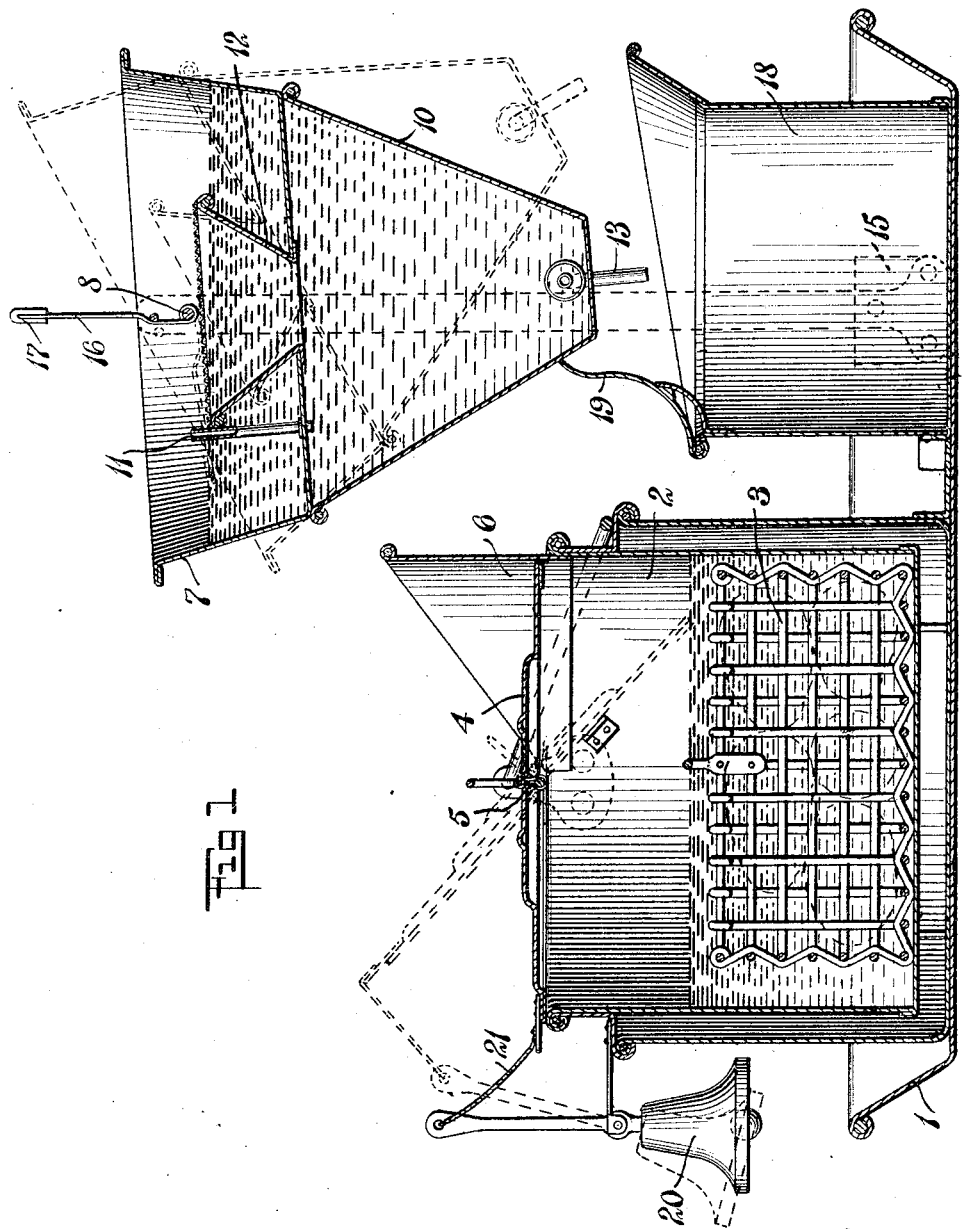

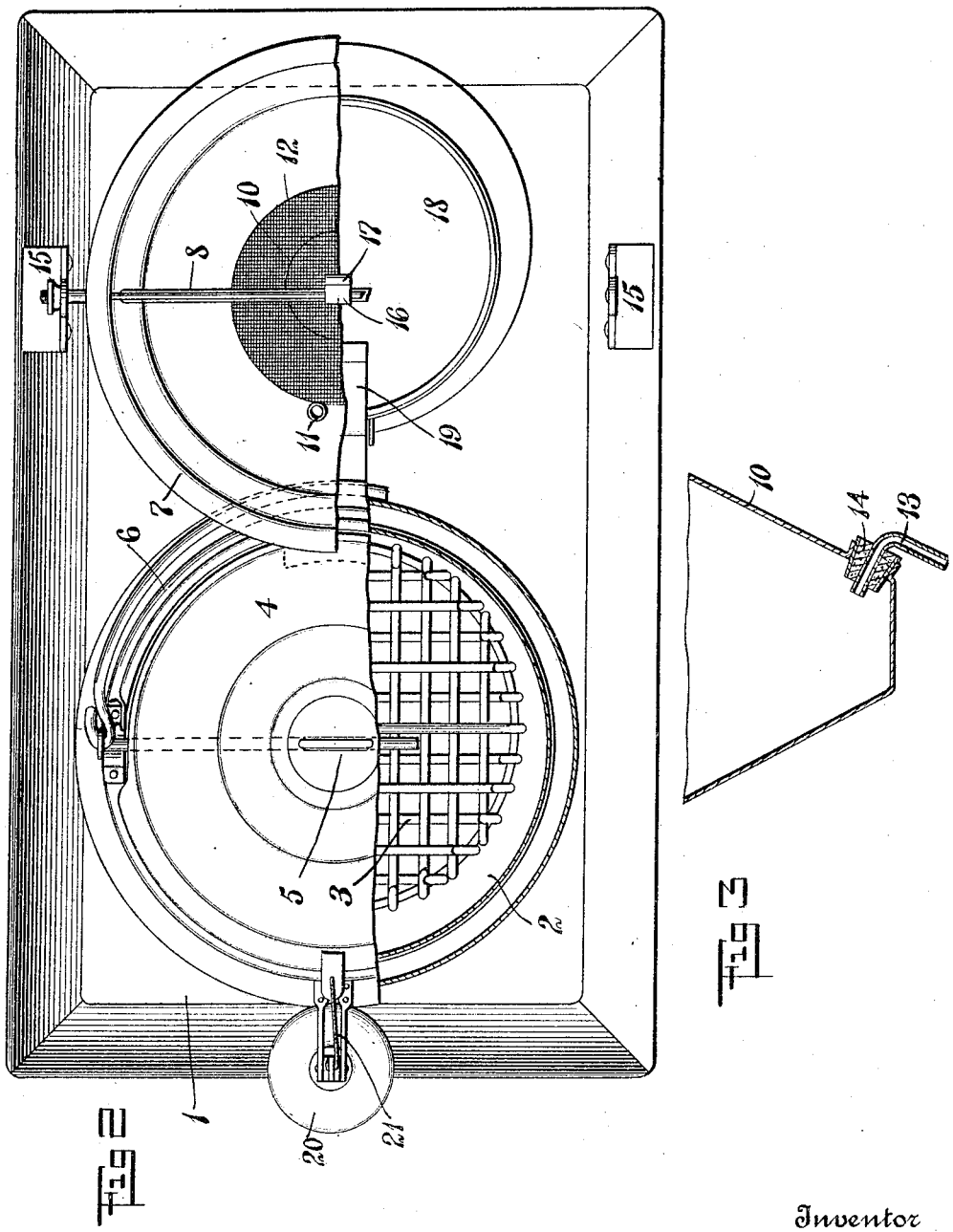

RALPH V. BLAKE, OF NEW YORK, N. Y.

EGG-COOKING APPARATUS AND TIMER.

1,230,845.   Specification of Letters Patent.   Patented June 26, 1917.

Application filed October 19, 1916. Serial No. 126,490.

*To all whom it may concern:*

Be it known that I, RALPH V. BLAKE, a citizen of the United States of America, residing at New York, N. Y., have invented a new and useful Egg-Cooking Apparatus and Timer, of which the following is a specification.

My invention relates to an egg cooking apparatus, the object being, broadly speaking, to provide automatic means for checking the cooking of the egg or eggs at a certain time and yet maintain the same in a warm condition for a substantial period after the actual cooking is checked.

In the accompanying drawings:

Figure 1 is a vertical longitudinal sectional elevation of the several parts as they appear in use.

Fig. 2 is a plan view thereof partly broken away.

Fig. 3 is a sectional view of a detail of construction.

1 represents a tray in which the various parts may be mounted in proper relation to each other as hereinafter described. 2 represents a vessel in which egg cooking is to be effected. 3 represents a cage in which the egg or eggs may be placed and by which the same may be conveniently placed in and removed from the vessel 2. 4 represents a removable cover for the vessel 2. This cover is pivoted approximately midway in its length, as at 5, and is so balanced that it will normally stand closed. 6 is an apron or splash guard at one edge of the vessel 2. 7 is a pan which is pivoted at 8, at a suitable point between its upper and lower edge. 10 is a reservoir carried underneath the pan 7. 11 is a vent for the reservoir 10. 12 is a funnel through the bottom of the pan 7 leading into the reservoir 10. 13 is a controller which preferably is in the form of a right angle tube (see Fig. 3) which passes through a suitable packing such as a cork 14 located near the bottom of the reservoir 10. The pivot 8 for the pan is supported by suitable brackets 15—15 which may be carried by the tray 1. 16 is what I may term an accelerator the same comprising a bar having a weighted upper end 17, said bar being pivoted at its lower end on the pivot 8. 18 is a catch basin. 19 is a stop designed to normally position the pan 7 and reservoir 10. 20 is a signal, preferably a bell, which may be connected by a cord 21 to cover 4.

Having now described the various features of construction, I will proceed to describe the operation. One or more eggs may be placed in the basket 3 and placed in the bottom of the cooking vessel 2. The reservoir 10 is filled with water, and the pan 7 is filled with water to approximately the level indicated in the drawings. So long as a sufficient quantity of water is contained in the reservoir 10 the pan will remain in the position indicated in solid lines, Fig. 1. When, however, a sufficient volume of water has escaped from the reservoir 10 the center of gravity will move up to a point above the point 8 whereupon the pan and reservoir will bodily tilt in the direction indicated by the dotted lines, whereby the cold water contents of the pan 7 will be dumped into the vessel 2. This discharge of the cold water is so directed that it will strike against one side of the cover 4 which tilts to the dotted line position sounding the alarm and at the same time permitting the cold water to enter the vessel 2.

To cook the eggs boiling water is poured into the vessel 2 so as to cover the eggs to the proper depth. The moment the cooking commences the water in the reservoir 10 should be permitted to escape through the controller 13 which is so designed that the time occupied in permitting the level of water in the reservoir 10 to lower to a point where the water in the pan 7 may be discharged into the vessel 2 will be just sufficient to effect the desired cooking of the egg or eggs. Various means may be provided to vary this timing of the discharge of said cold water into said receptacle, but in the preferred form I employ a controller 13 such as shown. When the lower end of the controller tube hangs down, there is a maximum head of water in the reservoir 10 which causes a relatively rapid escape of water therefrom. When, however, said pipe end is turned up, it is obvious that the head is relatively lowered, and the discharge will be slower. Therefore, by turning the controller 13 the speed of discharge may be varied, the timing of the cooking can be controlled.

The effect of discharging the cold water from the pan 7 into the vessel 2 is obviously to reduce the temperature of the water therein to a point where the cooking will be checked, but the water in the vessel 2 will still be of a sufficiently high temperature to maintain the eggs in a warm condition for a relatively long period, since the cooling process from then on will be relatively slow.

The guard 6 being arranged adjacent to the point where the water is discharged from the pan 7 into the vessel 2 serves to prevent the side splash of water when it strikes the cover 4.

The so-called accelerator 16, when the parts are in the position indicated in solid lines stands in an upright position. When, however, the pan 7 starts to tilt, the accelerator will be correspondingly tilted forward and will fall to the left hand side of the pan as viewed in Fig. 1, where it will strike against the upper end of the funnel 12 and will by gravity assist in tilting the pan 7.

Obviously the pan should be so mounted that when the center of gravity is above the pivotal mounting thereof, the pan will tip in a direction to dump its contents into the cooking receptacle, and obviously while I prefer to use a liquid counterweight, it is not my desire to be limited to such use in all cases. It should be understood that I have shown my invention only in its preferred form and that a variety of changes of the various parts and arrangements may be resorted to without departure from the spirit and scope of the invention.

What I claim is:

1. In an apparatus for controlling the cooking of eggs, a receptacle having two compartments, one above the other, the upper compartment having a central opening leading to the lower compartment, the lower compartment having a discharge outlet, means for controlling the discharge of water from the lower compartment independently of the upper compartment, a pivotal support for the receptacle near its upper portion and a stop for holding the receptacle in position so that its center of gravity when both compartments are filled with water is at one side of the vertical plane through the pivotal support whereby when the water has been discharged from the lower compartment the receptacle will become over balanced and discharge the water from the upper compartment.

2. In an apparatus for controlling the cooking of eggs, a receptacle having two compartments, one above the other, adapted to contain independently controllable quantities of water, the lower compartment having a discharge outlet, means for controlling the discharge of water from the lower compartment independently of and without affecting the quantity of water in the upper compartment, a pivotal support for the receptacle arranged substantially above the center of gravity of the receptacle when both compartments are filled with water, the center of gravity of the receptacle and contents of the upper compartment being at one side of the vertical plane through the pivotal support so that when the lower compartment is emptied the receptacle will automatically tilt and discharge the contents of the upper compartment for the purpose specified.

3. In an egg cooking apparatus, a control member comprising a receptacle having two compartments one compartment being arranged at the upper part of the receptacle and adapted to contain a definite volume of water to be poured into the water containing the cooking eggs for checking the cooking thereof, the other compartment being in the lower part of the receptacle and tapering toward the bottom and toward the center and adapted to contain a volume of counterweight water independent of the water in the upper compartment, said lower compartment having an outlet near its lower end adapted to discharge water independently of the upper compartment, a pivotal support near its upper end and means for holding the receptacle when both compartments are filled with water in a position such that the center of gravity of the receptacle and contents is at one side of the vertical plane extending through the pivotal support, whereby when the water has substantially run out of the lower compartment, the load of water in the upper compartment will tilt the receptacle and discharge the contents of the upper compartment for the purpose specified.

4. In an egg cooking apparatus, a control member comprising a receptacle having two compartments, one compartment being arranged at the upper part of the receptacle and adapted to contain a definite volume of water to be poured into the water containing the cooking eggs for checking the cooking thereof, the other compartment being in the lower part of the receptacle and tapering toward the bottom and toward the center and adapted to contain a volume of counterweight water independent of the water in the upper compartment, said lower compartment having an outlet near its lower end adapted to discharge water independently of the upper compartment, a pivotal support near its upper end, means for holding the receptacle when both compartments are filled with water in a position such that the center of gravity of the receptacle and contents is at one side of the vertical plane extending through the pivotal support, whereby when the water has substantially run out of the lower compartment, the load of water in the upper compartment will tilt the receptacle and discharge the contents of the upper compartment and a permanent counterweight attached to the receptacle and movable with respect thereto, means for normally holding the counterweight in an inactive position, said counterweight being adapted to swing toward the depressing side of the receptacle when the receptacle begins to tilt and having relative freedom of movement with relation to the receptacle in that direction for the purpose specified.

RALPH V. BLAKE.